US007706516B2

(12) United States Patent  
Seligmann

(10) Patent No.: US 7,706,516 B2
(45) Date of Patent: Apr. 27, 2010

(54) INTELLIGENT HANDLING OF MESSAGE REFUSAL

(75) Inventor: Doree Duncan Seligmann, New York, NY (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 10/262,798

(22) Filed: Oct. 2, 2002

(65) Prior Publication Data

US 2004/0066919 A1 Apr. 8, 2004

(51) Int. Cl.
*H04M 3/42* (2006.01)
(52) U.S. Cl. .................... 379/201.07; 455/466
(58) Field of Classification Search ............... 379/57, 379/88.18, 88.21, 215, 88.15, 88.13, 201.01, 379/201.02, 214.01, 201.06, 201.07, 207.08, 379/209.01, 210.01, 211.01, 88.12, 84, 70; 455/401, 404.2, 567, 557, 412.2, 413, 417, 455/466; 709/228, 201, 225; 370/409
See application file for complete search history.

(56) References Cited

U.S. PATENT DOCUMENTS

| | | | |
|---|---|---|---|
| 5,128,981 | A | 7/1992 | Tsukamoto et al. |
| 5,224,156 | A | 6/1993 | Fuller et al. |
| 5,276,731 | A | 1/1994 | Arbel et al. |
| 5,311,173 | A | 5/1994 | Komura et al. |
| 5,428,663 | A | 6/1995 | Grimes et al. |
| 5,479,476 | A | 12/1995 | Finke-Anlauff |
| 5,481,590 | A * | 1/1996 | Grimes .................... 340/7.21 |
| 5,570,100 | A | 10/1996 | Grube et al. |
| 5,790,974 | A | 8/1998 | Tognazzini |
| 5,805,587 | A | 9/1998 | Norris et al. |
| 5,918,179 | A | 6/1999 | Foladare et al. |
| 5,938,721 | A | 8/1999 | Dussell et al. |
| 6,026,156 | A * | 2/2000 | Epler et al. ............ 379/215.01 |
| 6,108,532 | A * | 8/2000 | Matsuda et al. ............ 455/413 |
| 6,122,366 | A | 9/2000 | Veschi et al. |
| 6,155,974 | A | 12/2000 | Fish |
| 6,157,640 | A | 12/2000 | Valentine |

(Continued)

FOREIGN PATENT DOCUMENTS

DE 4400207 A1 7/1994

(Continued)

OTHER PUBLICATIONS

Gkeli, Maria, "EP Application No. 03 254 175.7 Office Action", Feb. 19, 2009, Publisher: EPO, Published in: EP.

(Continued)

*Primary Examiner*—Olisa Anwah
(74) *Attorney, Agent, or Firm*—DeMont & Breyer, LLC

(57) ABSTRACT

An apparatus for intelligently responding when a user refuses an incoming message at a telecommunications terminal is disclosed. In the illustrative embodiments, the apparatus comprises a processor that prompts the user to optionally specify (i) one or more acceptable alternative message delivery mechanisms (e.g., email, text chat, etc.), and/or (ii) one or more alternative devices (e.g., pager, PDA, etc.) when a user refuses an incoming message. For example, a user in a noisy environment who refuses a voice telephone call might specify the following as alternative delivery mechanisms and devices: short message service (SMS) on the user's pager, text chat on the same device as the first message, and email on the user's personal digital assistant (PDA).

10 Claims, 13 Drawing Sheets

U.S. PATENT DOCUMENTS

| | | | |
|---|---|---|---|
| 6,160,481 A | 12/2000 | Taylor, Jr. | |
| 6,185,433 B1* | 2/2001 | Lele et al. | 455/528 |
| 6,208,859 B1 | 3/2001 | Halvorson | |
| 6,212,470 B1 | 4/2001 | Seymour et al. | |
| 6,222,482 B1 | 4/2001 | Gueziec | |
| 6,353,611 B1 | 3/2002 | Norris et al. | |
| 6,356,533 B1 | 3/2002 | Bruno et al. | |
| 6,363,248 B1 | 3/2002 | Silverman | |
| 6,396,416 B1 | 5/2002 | Kuusela et al. | |
| 6,408,063 B1* | 6/2002 | Slotte et al. | 379/230 |
| 6,411,687 B1* | 6/2002 | Bohacek et al. | 379/88.21 |
| 6,434,404 B1 | 8/2002 | Claxton et al. | |
| 6,442,242 B1* | 8/2002 | McAllister et al. | 379/67.1 |
| 6,529,737 B1* | 3/2003 | Skinner et al. | 455/466 |
| 6,535,748 B1 | 3/2003 | Vuorio et al. | |
| 6,542,584 B1* | 4/2003 | Sherwood et al. | 379/88.18 |
| 6,584,316 B1 | 6/2003 | Akhteruzzaman et al. | |
| 6,678,515 B1* | 1/2004 | Gillespie et al. | 455/412.1 |
| 6,701,160 B1 | 3/2004 | Pinder et al. | |
| 6,714,778 B2 | 3/2004 | Nykaenen et al. | |
| 6,741,678 B2* | 5/2004 | Cannell et al. | 379/88.14 |
| 6,760,581 B2* | 7/2004 | Dutta | 455/414.1 |
| 6,763,089 B2* | 7/2004 | Feigenbaum | 379/52 |
| 6,763,105 B1 | 7/2004 | Miura et al. | |
| 6,813,264 B2 | 11/2004 | Vassilovski | |
| 6,816,577 B2* | 11/2004 | Logan | 379/67.1 |
| 6,847,892 B2 | 1/2005 | Zhou et al. | |
| 6,898,445 B2* | 5/2005 | Slettengren et al. | 455/567 |
| 6,917,680 B1 | 7/2005 | Korn et al. | |
| 6,954,657 B2* | 10/2005 | Bork et al. | 455/567 |
| 6,968,179 B1 | 11/2005 | De Vries | |
| 6,970,553 B1* | 11/2005 | Gao et al. | 379/265.09 |
| 6,978,136 B2* | 12/2005 | Jenniges et al. | 455/435.1 |
| 7,010,288 B2* | 3/2006 | Brown et al. | 455/412.1 |
| 7,024,176 B2 | 4/2006 | Shimizu et al. | |
| 7,024,229 B2 | 4/2006 | Nishimura | |
| 7,127,259 B2* | 10/2006 | Ueda et al. | 455/456.1 |
| 7,130,644 B2* | 10/2006 | Kuwahra et al. | 455/456.3 |
| 7,142,895 B2* | 11/2006 | Heatley | 455/574 |
| 7,149,300 B1* | 12/2006 | Khan et al. | 379/212.01 |
| 7,180,991 B2* | 2/2007 | Dhara et al. | 379/142.01 |
| 7,236,774 B2* | 6/2007 | Lee | 455/417 |
| 2001/0006893 A1 | 7/2001 | Yoshioka | |
| 2001/0028709 A1* | 10/2001 | Makela et al. | 379/214.01 |
| 2001/0031633 A1* | 10/2001 | Tuomela et al. | 455/417 |
| 2002/0010008 A1 | 1/2002 | Bork et al. | |
| 2002/0059434 A1* | 5/2002 | Karaoguz et al. | 709/228 |
| 2002/0067308 A1 | 6/2002 | Robertson | |
| 2002/0086680 A1 | 7/2002 | Hunzinger | |
| 2002/0089421 A1 | 7/2002 | Farringdon et al. | |
| 2002/0094076 A1 | 7/2002 | Chen | |
| 2002/0098844 A1* | 7/2002 | Friedenfelds et al. | 455/445 |
| 2002/0146107 A1 | 10/2002 | Baals et al. | |
| 2003/0003901 A1* | 1/2003 | Kuroiwa | 455/419 |
| 2003/0003922 A1 | 1/2003 | McClure | |
| 2003/0039339 A1* | 2/2003 | Luehrig et al. | 379/88.13 |
| 2003/0040308 A1 | 2/2003 | Gieseke | |
| 2003/0054865 A1* | 3/2003 | Byers et al. | 455/567 |
| 2003/0055912 A1 | 3/2003 | Martin, Jr. et al. | |
| 2003/0086411 A1 | 5/2003 | Vassilovski | |
| 2003/0095643 A1* | 5/2003 | Fortman et al. | 379/88.14 |
| 2003/0112178 A1 | 6/2003 | Bajikar | |
| 2003/0134660 A1* | 7/2003 | Himmel et al. | 455/557 |
| 2003/0186676 A1 | 10/2003 | Ogman et al. | |
| 2003/0208113 A1 | 11/2003 | Mault et al. | |
| 2003/0220835 A1 | 11/2003 | Barnes, Jr. | |
| 2004/0014486 A1 | 1/2004 | Carlton et al. | |
| 2004/0067751 A1 | 4/2004 | Vandermeijden et al. | |
| 2004/0072558 A1 | 4/2004 | Van Bosch | |
| 2004/0082317 A1* | 4/2004 | Graefen | 455/413 |
| 2004/0128359 A1 | 7/2004 | Horvitz et al. | |
| 2004/0137884 A1* | 7/2004 | Engstrom et al. | 455/414.1 |
| 2004/0147814 A1* | 7/2004 | Zancho et al. | 600/300 |
| 2004/0198427 A1* | 10/2004 | Kimbell et al. | 455/556.1 |
| 2006/0079222 A1 | 4/2006 | Martin | |
| 2007/0037605 A1* | 2/2007 | Logan | 455/567 |

FOREIGN PATENT DOCUMENTS

| | | |
|---|---|---|
| DE | 19651781 A1 | 12/1996 |
| EP | 0865188 A2 | 9/1998 |
| EP | 0957619 A1 | 11/1999 |
| EP | 1008946 | 6/2000 |
| EP | 1 172 991 | 1/2002 |
| GB | 2303271 A | 2/1997 |
| GB | 2357218 A | 6/2001 |
| JP | 4109961 A | 4/1992 |
| JP | 5111474 A | 5/1993 |
| JP | 6070898 A | 3/1994 |
| JP | 09113599 | 2/1997 |
| JP | 2000-311145 A | 11/2000 |
| JP | 2002-208890 A | 7/2002 |
| WO | 9716932 A1 | 5/1997 |
| WO | WO 97/50231 | 12/1997 |
| WO | 9837680 A2 | 8/1998 |
| WO | 0150788 A1 | 7/2001 |
| WO | 0209396 A2 | 1/2002 |
| WO | 02071638 A1 | 9/2002 |
| WO | 03009622 A1 | 1/2003 |

OTHER PUBLICATIONS

Ali Mian, "Canadian Patent Application No. 2,488,428 Office Action", May 16, 2008, Published in: CA.

S. Chhim, "CA Application No. 2,433,477 Office Action May 11, 2009", , Publisher: CIPO, Published in: CA.

S. Chhim, "CA Application No. 2,433,477 Office Action", Jan. 5, 2009, Publisher: CIPO, Published in: CA.

S.Chhim, "Canadian Patent Application No. 2,433,477 Office Action", Feb. 22, 2005, Publisher: CIPO, Published in: CA.

S.Chhim, "Canadian Patent Application No. 2,433,477 Office Action", Mar. 16, 2006, Publisher: CIPO, Published in: CA.

S.Chhim, "Canadian Patent Application No. 2,433,477 Office Action", May 1, 2008, Publisher: CIPO, Published in: CA.

S.Chhim, "Canadian Patent Application No. 2,433,477 Office Action", Jun. 5, 2007, Publisher: CIPO, Published in: CA.

S.Chhim, "Canadian Patent Application No. 2,433,477 Office Action", Jul. 5, 2005, Publisher: CIPO, Published in: CA.

S.Chhim, "Canadian Patent Application No. 2,433,477 Office Action", Aug. 31, 2006, Publisher: CIPO, Published in: CA.

Domingos, Luis, "EP Application No. 03254177.3 Office Action", Feb. 14, 2006, Publisher: EPO, Published in: EP.

Domingos, Luis, "EP Application No. 03254177.3 Office Action", Mar. 24, 2005, Publisher: EPO, Published in: EP.

Domingos, L., "EP Application No. 03254177.3 Office Action Aug. 24, 2006" , , Publisher: EPO, Published in: EP.

Domingos, Luis, "EP Application No. 03254177.3 Search Report", Jun. 16, 2004, Publisher: EPO, Published in: EP.

Domingos, Luis, "EP Application No. 03254177.3 Search Report", Sep. 10, 2004, Publisher: EPO, Published in: EP.

Domingos, L., "EP Application No. 05012972.5 Office Action", Feb. 24, 2006, Publisher: EPO, Published in: EP.

Domingos, Luis, "EP Application No. 05012972.5 Office Action", Apr. 23, 2009, Publisher: EPO, Published in: EP.

Domingos, Luis, "EP Application No. 05012972.5 Office Action", Jul. 5, 2007, Publisher: EPO, Published in: EP.

Domingos, Luis, "EP Application No. 05012972.5 Search Report", Aug. 29, 2005, Publisher: EPO, Published in: EP.

Win, Aung T., "U.S. Appl. No. 10/186,443 Decision on Appeal Nov. 19, 2008" , , Publisher: USPTO, Published in: US.

Win, Aung T., "U.S. Appl. No. 10/186,443 Examiner's Answer Feb. 25, 2008", , Publisher: USPTO, Published in: US.

Win, Aung T., "U.S. Appl. No. 10/186,443 Office Action", Nov. 16, 2007, Publisher: USPTO, Published in: US.

Chang, Wei H, "U.S. Appl. No. 10/186,443 Office Action", Dec. 28, 2004, Publisher: USPTO, Published in: US.

Win, Aung T., "U.S. Appl. No. 10/186,443 Office Action", Feb. 20, 2007, Publisher: USPTO, Published in: US.

Win, Aung T., "U.S. Appl. No. 10/186,443 Office Action", Mar. 20, 2006, Publisher: USPTO, Published in: US.

Win, Aung T., "U.S. Appl. No. 10/186,443 Office Action", Jul. 14, 2005, Publisher: USPTO, Published in: US.

Win, Aung T., "U.S. Appl. No. 10/186,443 Office Action", Aug. 10, 2006, Publisher: USPTO, Published in: US.

S.Chhim, "CA Application No. 2,433,478 Office Action", Feb. 22, 2005, Publisher: CIPO, Published in: CA.

S.Chhim, "CA Application No. 2,433,478 Office Action", Feb. 28, 2006, Publisher: CIPO, Published in: CA.

S.Chhim, "CA Application No. 2,433,478 Office Action", Aug. 5, 2005, Publisher: CIPO, Published in: CA.

Gkeli, M, "EP Application No. 03254175.7 Office Action", Jul. 17, 2006, Publisher: EPO, Published in: EP.

Gkeli, M, "EP Application No. 03254175.7", Jul. 4, 2005, Publisher: EPO, Published in: EP.

Gkeli, M, "EP Application No. 03254175.7 Search Report", Sep. 19, 2003, Publisher: EPO, Published in: EP.

Tieu, Benny Quoc, "U.S. Appl. No. 10/186,859 Notice of Allowance", Jan. 24, 2006, Publisher: USPTO, Published in: US.

Tieu, Benny Quoc, "U.S. Appl. No. 10/186,859 Office Action", Dec. 1, 2005, Publisher: USPTO, Published in: US.

Tieu, Benny Quoc, "U.S. Appl. No. 10/186,859 Office Action", Dec. 16, 2004, Publisher: USPTO, Published in: US.

Tieu, Benny Quoc, "U.S. Appl. No. 10/186,859 Office Action", Jun. 7, 2005, Publisher: USPTO, Published in: US.

Tieu, Benny Quoc, "U.S. Appl. No. 10/186,859 Office Action", Sep. 20, 2005, Publisher: USPTO, Published in: US.

Harold, Jefferey F., "U.S. Appl. No. 10/263,616 Notice of Allowance Aug. 30, 2006", , Publisher: USPTO, Published in: US.

Harold, Jefferey F, "U.S. Appl. No. 10/263,616 Office Action", Dec. 17, 2004, Publisher: USPTO, Published in: US.

Harold, Jefferey F, "U.S. Appl. No. 10/263,616 Office Action", Dec. 29, 2005, Publisher: USPTO, Published in: US.

Harold, Jeffery F, "U.S. Appl. No. 10/263,616 Office Action", Apr. 7, 2006, Publisher: USPTO, Published in: US.

Harold, Jefferey F, "U.S. Appl. No. 10/263,616 Office Action", Jun. 28, 2005, Publisher: USPTO, Published in: US.

Deczky, Kristina, "CA Application No. 2,454,966 Office Action", Mar. 26, 2008, Publisher: CIPO, Published in: CA.

Deczky, Kristina, "CA Application No. 2,454,966 Office Action", May 15, 2007, Publisher: CIPO, Published in: CA.

Deczky, "CA Application No. 2,454,966 Office Action", May 25, 2006, Publisher: CIPO Published in: CA.

Bodnar, Kristina, "CA Application No. 2,454,966 Office Action Jun. 25, 2009", , Publisher: CIPO, Published in: CA.

Breidenich, M, "EP Application No. 04250199.9 Office Action", Jan. 19, 2005, Publisher: EPO, Published in: EP.

Breidenich, M, "EP Application No. 04250199.9 Oral Proceedings Minutes", May 26, 2006, Publisher: EPO, Published in: EP.

"EP Application No. 04250199.9 Search Report", Apr. 1, 2004, Publisher: EPO, Published in: EP.

Breidenich, M, "EP Application No. 04250199.9 Summons to Oral Proceedings", Feb. 14, 2006, Publisher: EP, Published in: EP.

Lee, Gwi-Nam, "KR Application No. 10-2004-0003629 Office Action", Apr. 13, 2006, Publisher: KR, Published in: KR.

Lee, Gwi-Nam, "KR Application No. 10-2004-0003629 Office Action", Sep. 20, 2005, Publisher: KIPO, Published in: KR.

Kianersi, Mitra, "U.S. Appl. No. 10/350,399 Return of Undocketed Appeal to Examiner Mar. 12, 2009", , Publisher: USPTO, Published in: US.

Kianersi, Mitra, "U.S. Appl. No. 10/350,399 Examiner's Answer", Mar. 27, 2008, Publisher: USPTO, Published in: US.

Kianersi, Mitra, "U.S. Appl. No. 10/350,399 Office Action", Apr. 5, 2007, Publisher: USPTO, Published in: US.

Kianersi, Mitra, "U.S. Appl. No. 10/350,399 Office Action", Sep. 19, 2006, Publisher: USPTO, Published in: US.

Kianersi, Mitra, "U.S. Appl. No. 10/350,399 Panel Decision Nov. 6, 2007", , Publisher: USPTO, Published in: US.

Smith, Creighton H., "U.S. Appl. No. 10/375,252 Notice of Allowance", Nov. 4, 2005, Publisher: USPTO, Published in: US.

Smith, Creighton H., "U.S. Appl. No. 10/375,252", Apr. 22, 2005, Publisher: USPTO, Published in: US.

Smith, Creighton H., "U.S. Appl. No. 10/375,252", Jun. 17, 2005, Publisher: USPTO, Published in: US.

Smith, Creighton H, "U.S. Appl. No. 10/375,641 Notice of Allowance", Apr. 22, 2005, Publisher: US, Published in: US.

Jean A. Gelin, "PCT Application No. PCT/US03/14041 Office Action Apr. 7, 2004", , Publisher: PCT, Published in: PCT.

Jean A. Gelin, "PCT Application No. PCT/US03/14041 Search Report Oct. 23, 2003", , Publisher: PCT, Published in: PCT.

Rabe, M, "EP Application No. 04257418.6 Office Action", Mar. 1, 2006, Publisher: EPO, Published in: EP.

Rabe, M., "EP Application No. 04257418.6 Search Report", Oct. 4, 2005, Publisher: EPO, Published in: EP.

Fritz, Bradford F., "U.S. Appl. No. 10/727,915 Examiner's Answer Brief Jan. 28, 2009", , Publisher: USPTO, Published in: US.

Fritz, Bradford F, "U.S. Appl. No. 10/727,915 Office Action", Oct. 9, 2007, Publisher: USPTO, Published in: US.

Fritz, Bradford F, "U.S. Appl. No. 10/727,915 Office Action", Mar. 16, 2009, Publisher: USPTO, Published in: US.

Fritz, Bradford F., "U.S. Appl. No. 10/727,915 Office Action", Apr. 16, 2008, Publisher: USPTO, Published in: US.

Smith, Creighton H., "U.S. Appl. No. 11/169,552 Office Action", Aug. 9, 2007, Publisher: USPTO, Published in: US.

Smith, Creighton H., "U.S. Appl. No. 11/169,552 Office Action", Mar. 12, 2007, Publisher: USPTO, Published in: US.

Smith, Creighton H., "U.S. Appl. No. 11/169,552 Notice of Allowance", Jan. 23, 2008, Publisher: USPTO, Published in: US.

Smith, Creighton H, "U.S. Appl. No. 11/169,552 Office Action", Oct. 16, 2007, Publisher: USPTO, Published in: US.

Smith, Creighton H, "U.S. Appl. No. 11/169,552 Office Action", Dec. 21, 2006, Publisher: USPTO, Published in: US.

* cited by examiner

Telecommunications System 100

Public Switched Telephone Network (PSTN) 105

INTELLIGENT HANDLING OF MESSAGE REFUSAL

FIELD OF THE INVENTION

The present invention relates to telecommunications in general, and, more particularly, to telecommunications equipment that intelligently responds when a user refuses an incoming message.

BACKGROUND OF THE INVENTION

FIG. 1 depicts a schematic diagram of the salient components of a telecommunications system in accordance with the illustrative embodiments of the present invention. Telecommunications system 100 comprises: public switched telephone network (PSTN) 105, private branch exchange (PBX) 120, cellular network 150, and five telecommunications terminals: wireline telephones 110-1 and 110-2, cordless telephone 130, wireless telephone 160, and two-way pager 170. As shown in FIG. 1, PSTN 105 comprises central office 190; in addition, private branch exchange 120's antenna 125 communicates wirelessly with cordless telephone 130's antenna 135, and cellular network 150's antenna 155 communicates wirelessly with wireless telephone 160's antenna 165 and two-way pager 170's antenna 175.

In the prior art, a telecommunications terminal typically alerts the user to the arrival of an incoming message via some sensory mechanism; most commonly, this mechanism is an acoustic "telephone ring." In some instances (for example, when the user is busy) the user may refuse an incoming message; in the prior art, the user typically refuses a message by ignoring the sensory alert, or alternatively, usually in the case of a wireless terminal, powering down the terminal.

These techniques are very crude, however, as the user is not provided with any information about the message (except, in the case of terminals supporting "caller id," the identity of the sender). Furthermore, systems in the prior art generally lack an automatic facility for letting a user request an alternative delivery mechanism for the message (e.g., email, text chat, short message service (SMS), voice mail, etc.) and informing the sending party of this request. Finally, systems in the prior art may present the sending party with the option to leave a recorded message or be forwarded to an operator after a message has been refused; however, such systems generally do not present the sender with any additional, more sophisticated options (e.g., sending another message via another delivery mechanism, another device, etc.) Therefore, the need exists for a more sophisticated mechanism for intelligently handling message refusals.

SUMMARY OF THE INVENTION

The present invention provides several techniques for intelligently handling message refusals without some of the disadvantages for doing so in the prior art. In particular, the illustrative embodiments prompt the user (i.e., the callee) upon refusal to optionally specify:
  i. one or more acceptable alternative message delivery mechanisms (e.g., email, text chat, etc.), or
  ii. one or more alternative devices (e.g., pager, PDA, etc.), or
  iii. both i and ii.

The illustrative embodiments also prompt the sender to send a "follow-up" message that adheres to the user-specified mechanisms/devices, and optionally to specify a message priority (e.g., "emergency," etc.) or a message subject (e.g., "meeting time change," etc.) or both. The user is alerted to the follow-up message's arrival based on the selected mechanism, the selected device, and the presence and values of the message priority and message subject.

In addition, the illustrative embodiments automatically determine acceptable alternative delivery mechanisms and/or alternative devices when the user does not specify this information upon refusal; this determination is based on factors that include:
  i. the time and date (i.e., the "calendrical time"), or
  ii. environmental parameters (e.g., temperature, ambient luminosity, etc.), or
  iii. the user's physiological parameters (e.g., blood pressure, heart rate, etc.), or
  iv. the location of the user, or
  v. the proximity of other telecommunications terminals in the vicinity, or
  vi. whether the user is currently receiving another message, or
  vii. the delivery mechanism of the other message, or
  viii. any combination of i, ii, iii, iv, v, vi, and vii.

For example, if a user refuses a telephone call while in a noisy environment, it might be appropriate to specify the following as alternative delivery mechanisms and devices: short message service (SMS) on the user's pager, text chat on the same device as the original message, email on the user's personal digital assistant (PDA), etc.

The illustrative embodiments of the present invention comprise: a receiver for receiving a first signal addressed to a telecommunications terminal; and a processor for prompting the first signal's sender to send a second signal when the telecommunications terminal's user refuses the first signal, wherein the first signal is of a first signal type, and wherein the processor's prompting specifies at least one other signal type for the second signal.

DETAILED DESCRIPTION

Figure 2:
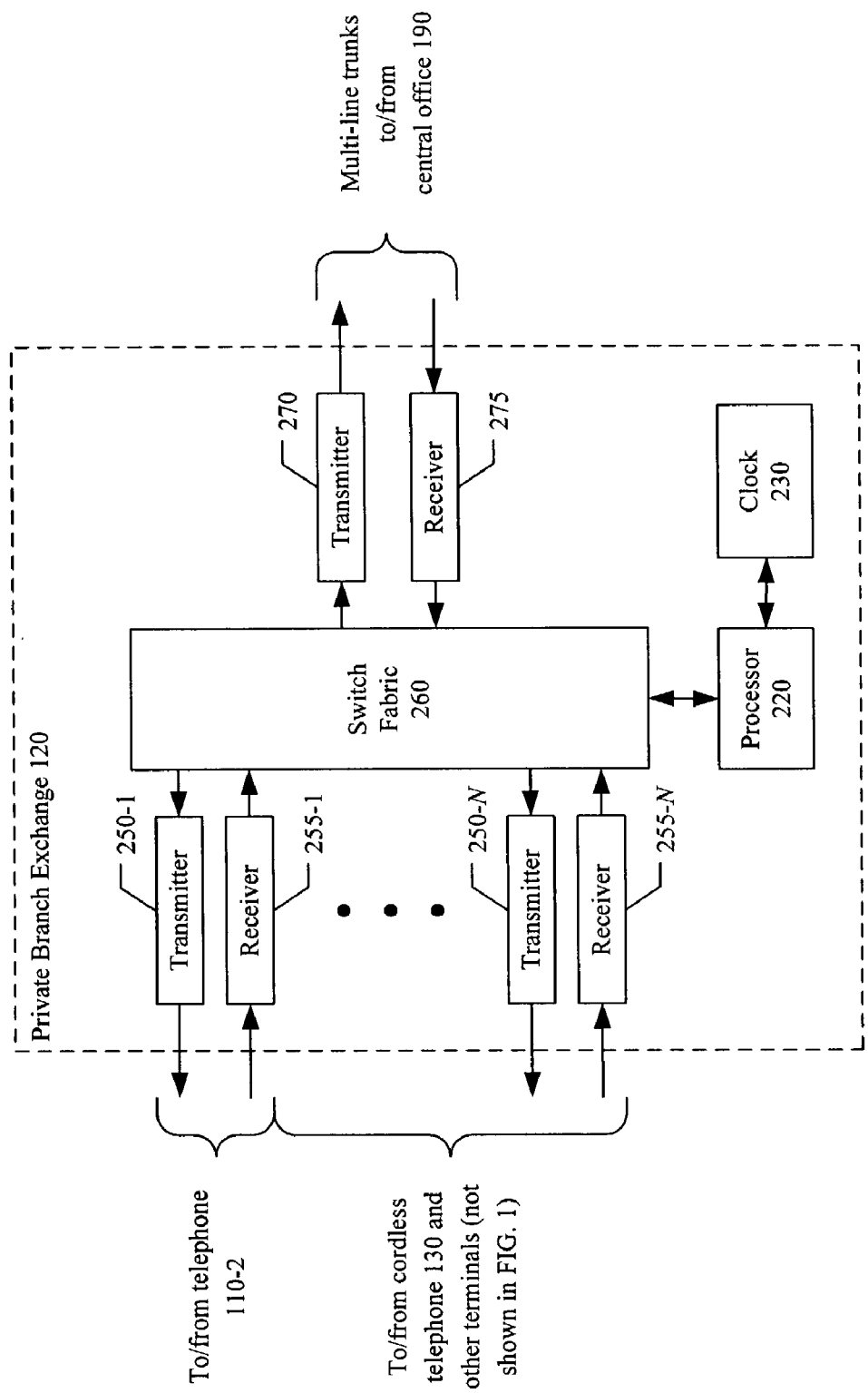
FIG. 2 depicts a block diagram of the first illustrative embodiment, in which the present invention resides solely in private branch exchange 120, as shown in FIG. 1.

FIG. 2 depicts a block diagram of the first illustrative embodiment, in which the present invention resides solely in private branch exchange 120. private branch exchange 120 comprises: switch fabric 260, processor 220, clock 230, transmitter 270, receiver 275, and N pairs of transmitters and receivers—transmitters 250-1 through 250-N and receivers 255-1 through 255-N-interconnected as shown, wherein N is a positive integer.

Switch fabric 260 enables private branch exchange 120 to establish a communications session between one or more terminals (e.g., telephone 110-1, etc.) and public switched telephone network 105. It will be clear to those skilled in the art how to make and use switch fabric 260.

Processor 220 is a programmed general-purpose processor; it will be clear to those skilled in the art, however, after reading this specification, how to make and use alternative embodiments of the present invention in which processor 220 is a "hard-wired" or special-purpose processor. Processor 220 performs switching logic, as is well-known in the art; in addition, processor 220 also performs processing for handling message refusals and follow-up messages, as is described in detail below in the descriptions of FIG. 10 and FIG. 13.

Clock 230 transmits the current time, date, and day of the week to processor 220, in well-known fashion. It will be clear to those skilled in the art how to make and use clock 230.

Transmitter 270 comprises the circuitry that enables private branch exchange 120 to transmit information-bearing electromagnetic signals to public switched telephone network 105. It will be clear to those skilled in the art how to make and use transmitter 270.

Receiver 275 comprises the circuitry that enables private branch exchange 120 to receive information-bearing electromagnetic signals from public switched telephone network 105. It will be clear to those skilled in the art how to make and use receiver 275.

Figure 1:
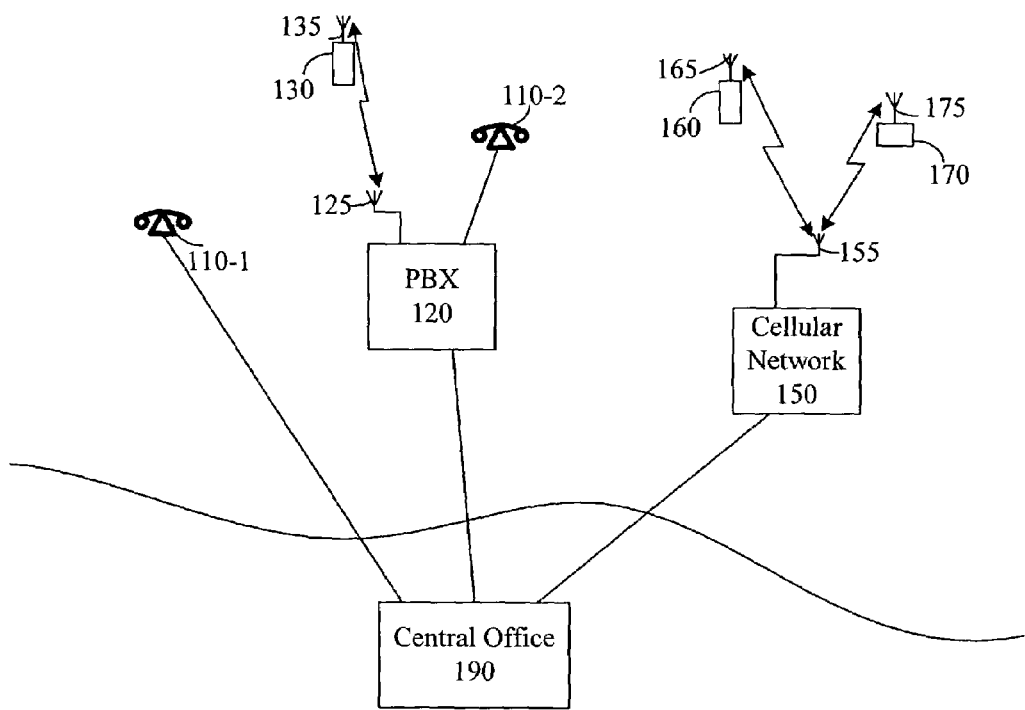
FIG. 1 depicts a block diagram of exemplary telecommunications system 100 attached to public switched telephone network (PSTN) 105.

Transmitters 250-i, for i=1 to N, comprises the circuitry that enables private branch exchange 120 to transmit information-bearing electromagnetic signals to wireline telephone 110-2, cordless telephone 130, and other terminals not depicted in FIG. 1. It will be clear to those skilled in the art how to make and use transmitter 250-i.

Receivers 255-i, for i=1 to N, comprises the circuitry that enables private branch exchange 120 to receive information-bearing electromagnetic signals from wireline telephone 110-2, cordless telephone 130, and other terminals not depicted in FIG. 1. It will be clear to those skilled in the art how to make and use receiver 255-i.

Figure 3:
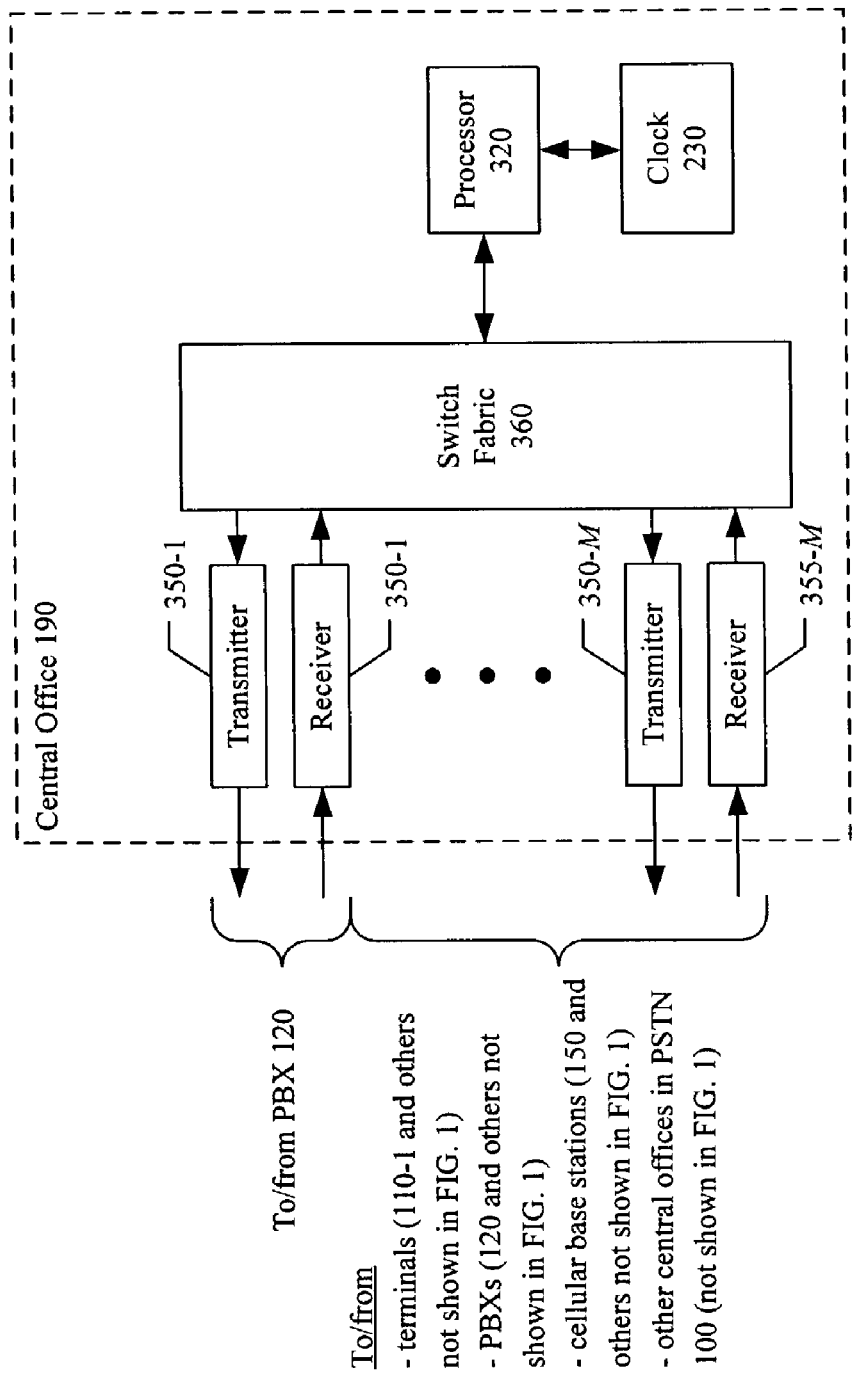
FIG. 3 depicts a block diagram of the second illustrative embodiment, in which the present invention resides solely in central office 190, as shown in FIG. 1.

FIG. 3 depicts a block diagram of the second illustrative embodiment, in which the present invention resides solely in central office 190. Central office 190 comprises: switch fabric 302, processor 320, clock 230, and M pairs of transmitters and receivers—transmitters 350-1 through 350-M and receivers 355-1 through 355-M-interconnected as shown, wherein M is a positive integer.

Switch fabric 360 enables central office 190 to establish a communications session between one or more telecommunications terminals, private branch exchanges, cellular base stations, and other central offices in public switched telephone network 105. It will be clear to those skilled in the art how to make and use switch fabric 360.

Processor 320 performs switching logic, as is well-known in the art, as well as processing for handling message refusals and follow-up messages in accordance with the present invention, as is described in detail below in the descriptions of FIG. 11 and FIG. 13. Processor 320 is a programmed general-purpose processor, but it will be clear to those skilled in the art how to make and use alternative embodiments of the present invention in which processor 320 is a "hard-wired" or special-purpose processor.

Transmitter 350-1 comprises the circuitry that enables central office 190 to transmit information-bearing electromagnetic signals to private branch exchange 120. It will be clear to those skilled in the art how to make and person transmitter 350-1.

Receiver 355-1 comprises the circuitry that enables central office 190 to receive information-bearing electromagnetic signals from private branch exchange 120. It will be clear to those skilled in the art how to make and use receiver 355-1.

Transmitter 350-j, for j=2 to M, comprises the circuitry that enables central office 190 to transmit information-bearing electromagnetic signals to terminals, private branch exchanges, cellular base stations, and other central offices in public switched telephone network 105. It will be clear to those skilled in the art how to make and use transmitter 350j.

Receiver 355-j, for j=2 to M, comprises the circuitry that enables central office 190 to receive information-bearing electromagnetic signals from terminals, private branch exchanges, cellular base stations, and other central offices in public switched telephone network 105. It will be clear to those skilled in the art how to make and use receiver 355-j.

Figure 4:
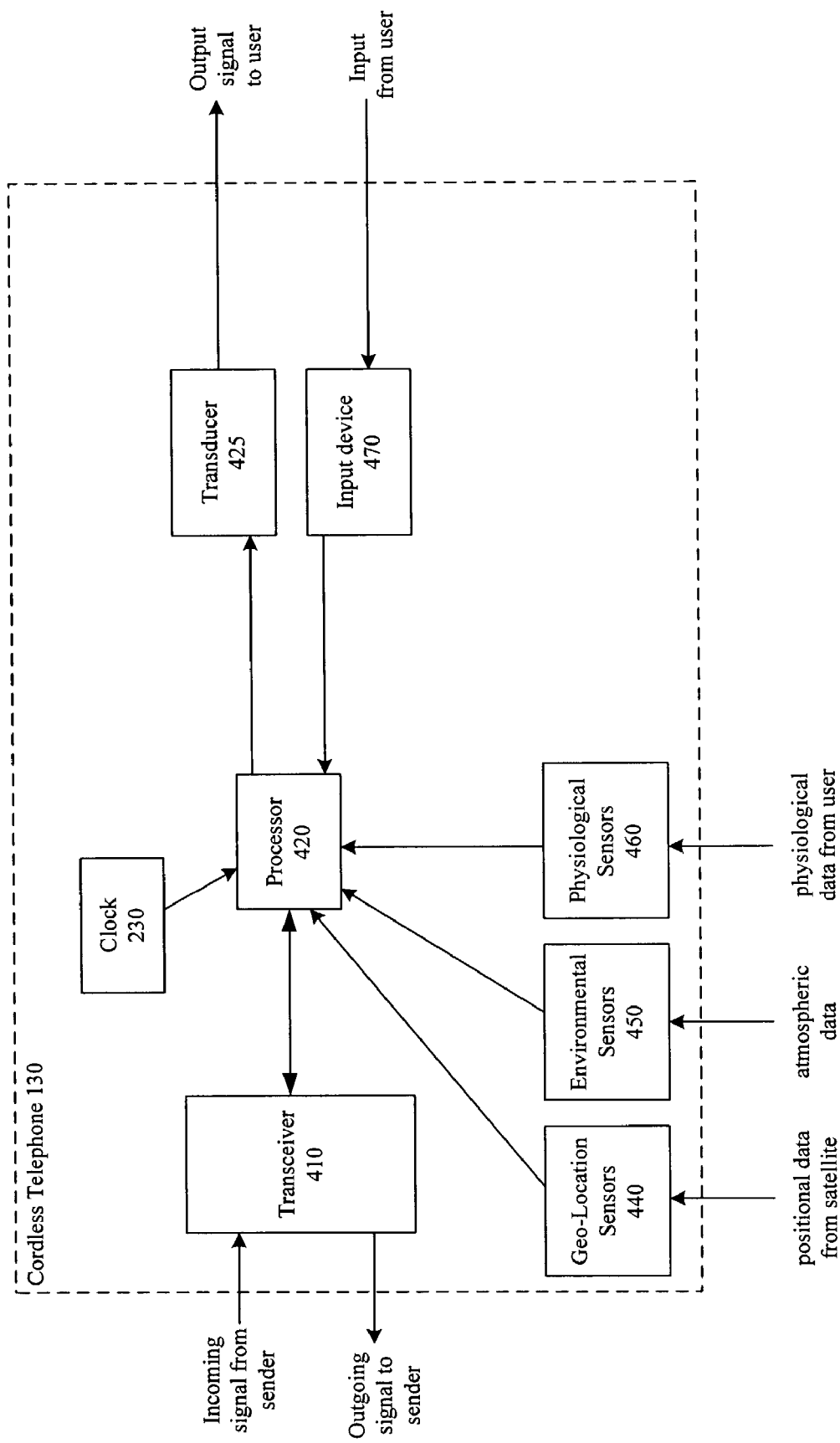
FIG. 4 depicts a block diagram of the third illustrative embodiment, in which the present invention resides solely in cordless telephone 130, as shown in FIG. 1.

FIG. 4 depicts a block diagram of the third illustrative embodiment, in which the present invention resides solely in cordless telephone 130. Cordless telephone 130 comprises: transceiver 410, processor 420, clock 230, geo-location sensors 440, environmental sensors 450, physiological sensors 460, and transducer 425, and input device 470, interconnected as shown.

Clock 230 transmits the current time, date, and day of the week to processor 220 in well-known fashion.

Geo-location sensors 440 receive positional data, as is described in detail below, and transmit these data to processor 420 in well-known fashion.

Environmental sensors 450 receive atmospheric data, as is described in detail below, and transmit these data to processor 420 in well-known fashion.

Physiological sensors 460 receive physiological data from a user, as is described in detail below, and transmit these data to processor 420 in well-known fashion.

Processor 420 performs processing for handling message refusals and follow-up messages, in accordance with the present invention, as is described in detail below in the descriptions of FIG. 12 and FIG. 13. Processor 420 is a programmed general-purpose processor, but it will be clear to those skilled in the art how to make and use alternative embodiments of the present invention in which processor 420 is a "hard-wired" or special-purpose processor.

Transducer 425 receives a signal from processor 420 to alert the user to the arrival of a message and generates a corresponding output signal, in well-known fashion. Although only a single transducer is depicted in FIG. 4, in some embodiments cordless telephone 130 will have multiple transducers (e.g., an acoustic transducer, a visual transducer, etc.), as is well known in the art.

Input device 470 receives input from a user and sends corresponding input signals to processor 420. Although only a single input device is depicted in FIG. 4, in some embodiments cordless telephone 130 will have multiple input devices (e.g., a keypad, a touchscreen, etc.), as is well-known in the art.

Figure 5:
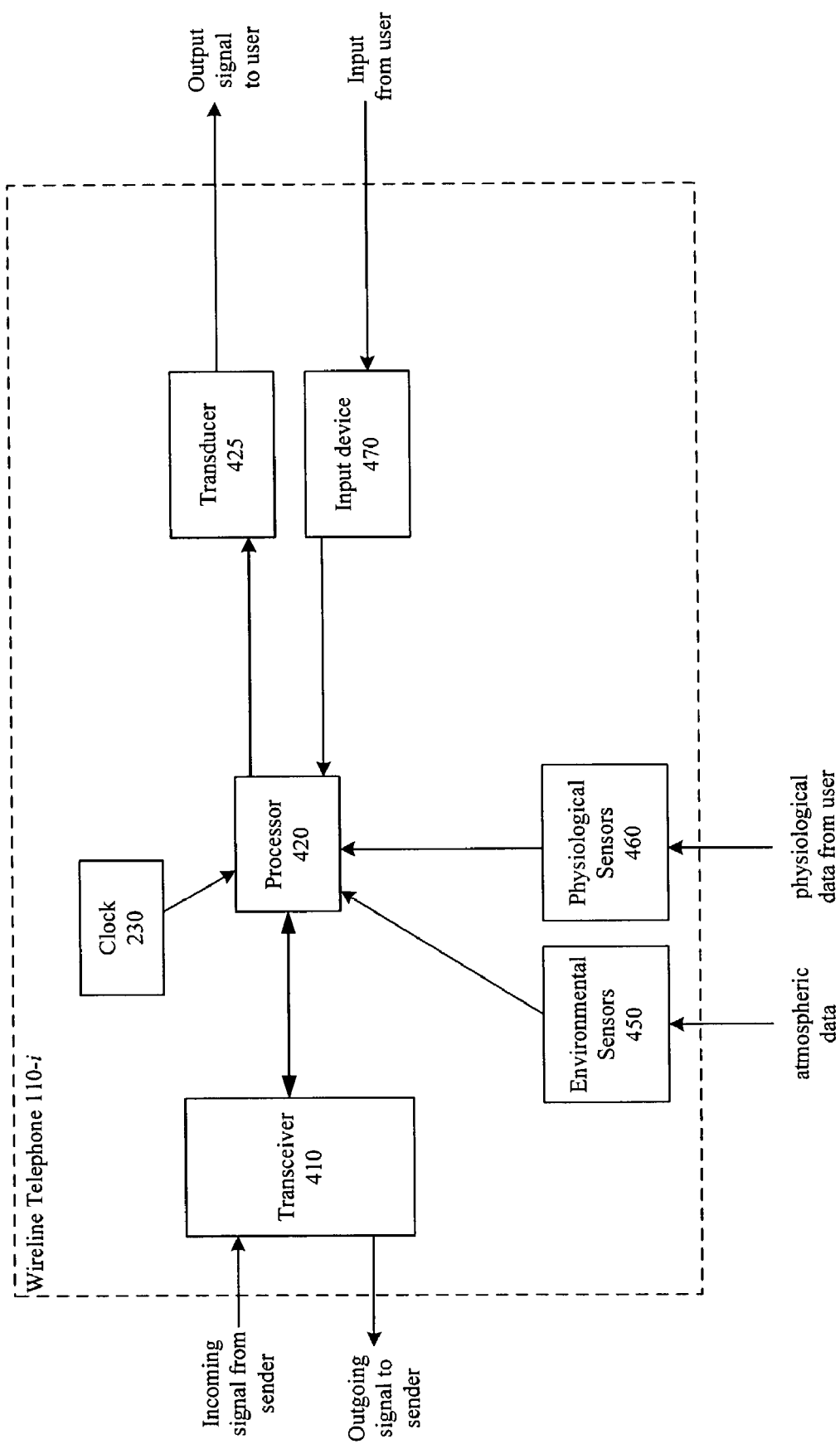
FIG. 5 depicts a block diagram of the third illustrative embodiment, in which the present invention resides solely in wireline terminal 110-i, as shown in FIG. 1.

FIG. 5 depicts a block diagram of the salient components of wireline telephone 110-i, in accordance with the third illustrative embodiment of the present invention. Wireline telephone 110-i comprises: receiver 410, processor 420, clock 230, environmental sensors 450, physiological sensors 460, transducer 425, and input device 470, interconnected as shown. As can be seen by comparing FIG. 5 with FIG. 4, wireline telephone 10-i is similar to cordless telephone 130, with the exception that wireline terminal 110-i does not have geo-location sensors 440, which are superfluous in a wireline terminal at a fixed position.

Figure 6:
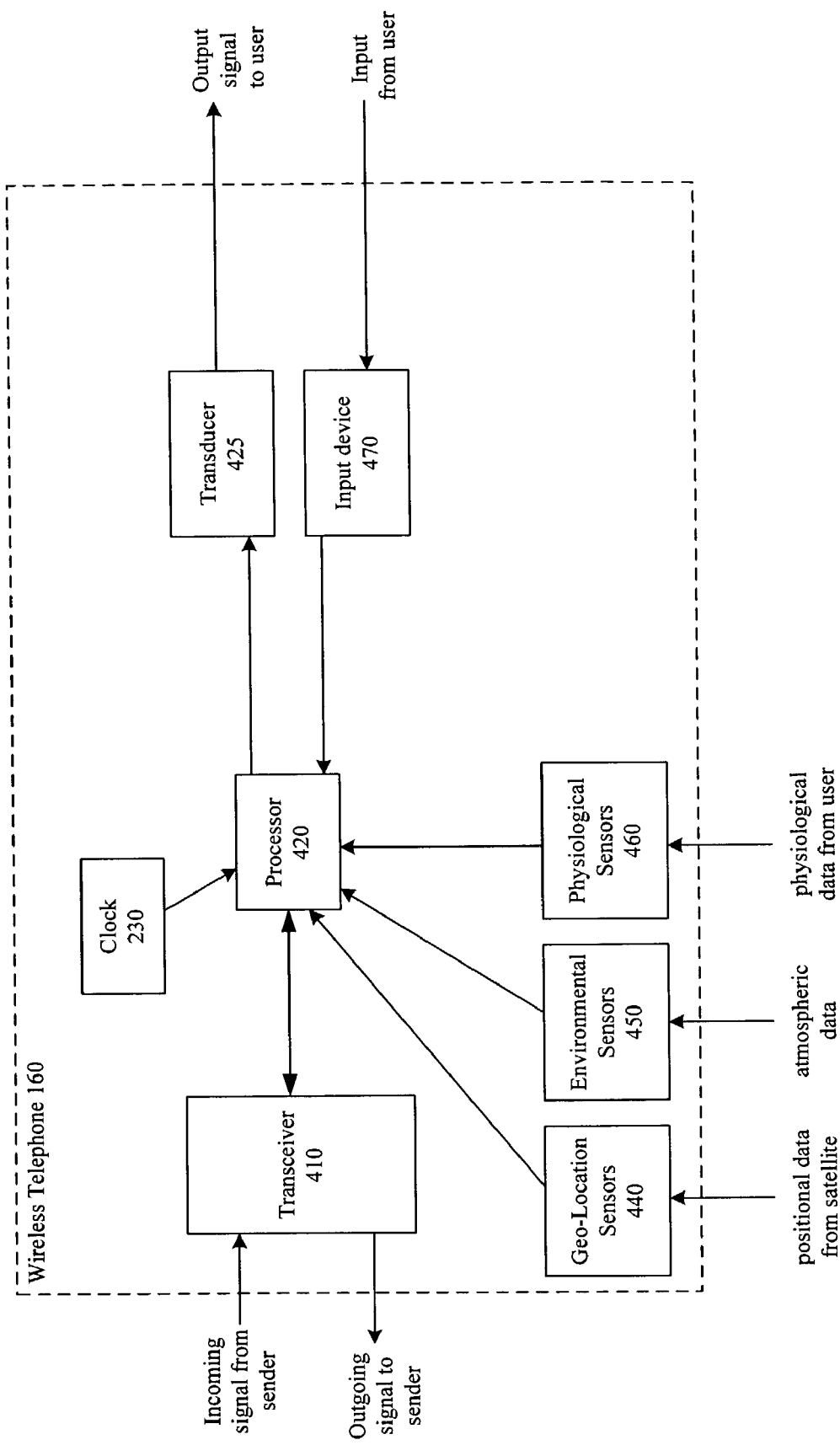
FIG. 6 depicts a block diagram of the third illustrative embodiment, in which the present invention resides solely in wireless telephone 160, as shown in FIG. 1.

FIG. 6 depicts a block diagram of the salient components of wireless telephone 160, in accordance with the third illustrative embodiment of the present invention. Wireless telephone 160 comprises: receiver 410, processor 420, clock 430, geo-location sensors 440, environmental sensors 450, physiological sensors 460, transducer 425, and input device 470, interconnected as shown. As can be seen by comparing FIG. 6 with FIG. 4, wireless telephone 160 is similar to cordless telephone 130.

Figure 7:
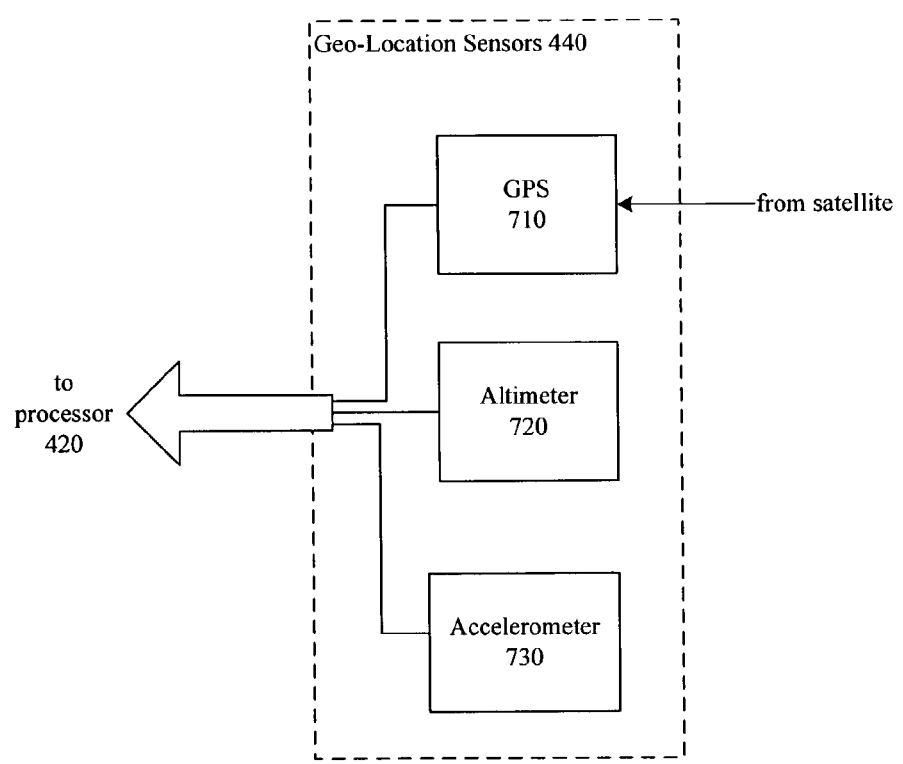
FIG. 7 depicts a block diagram of geo-location sensors 440, as shown in FIG. 4 and FIG. 6, in accordance with the third illustrative embodiment of the present invention.

FIG. 7 depicts a block diagram of the salient components of geo-location sensors 440, in accordance with the third illustrative embodiment of the present invention. Geo-location sensors 440 comprises: global positioning system (GPS) 710, altimeter 720, and accelerometer 730.

GPS 710 receives satellite-based signals and determines global position, as is well understood in the art, and transmits the data to processor 420. In some embodiments, GPS 710 also transmits information to processor 420 concerning the geo-locations of other wireless terminals in the vicinity; as described below, processor 420 can consider this information in determining how to alert the user to the arrival of the incoming message.

It will be clear to persons skilled in the art that some embodiments might employ means other than satellite-based signals for determining geo-location (e.g., triangulation, radio beacons, radio-frequency fingerprinting [U.S. Pat. No. 6,393,294, incorporated by reference], etc.) In such embodiments, an appropriate receiver (e.g., radio-frequency receiver, etc.) would be substituted for GPS 710, as is well understood in the art.

Altimeter 720 measures altitude, in well-known fashion, and transmits its measurements to processor 420; in some embodiments altimeter 720's readings are based on barometric pressure, and in some other embodiments altimeter 720 is radar-based.

Accelerometer 730 measures acceleration, in well-known fashion, and transmits its measurements to processor 420.

Figure 8:
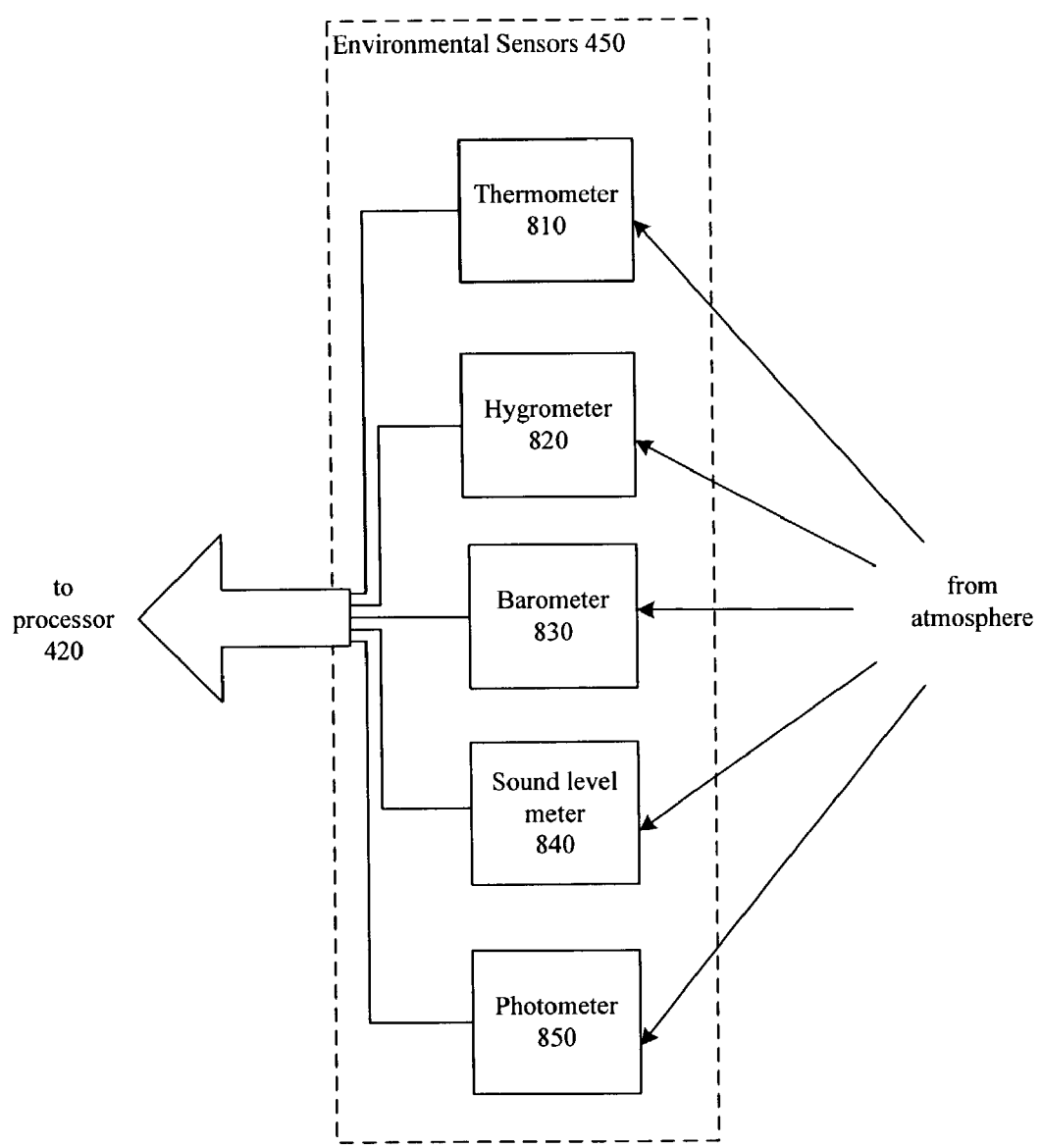
FIG. 8 depicts a block diagram of environmental sensors 450, as shown in FIGS. 4, 5, and 6, in accordance with the third illustrative embodiment of the present invention.

FIG. 8 depicts a block diagram of the salient components of environmental sensors 450, in accordance with the illustrative embodiment of the present invention. Environmental sensors 450 comprises: thermometer 810, hygrometer 820, barometer 830, sound level meter 840, and photometer 850, all of which receive information from the atmosphere.

Thermometer 810 measures ambient temperature, in well-known fashion, and transmits its measurements to processor 420.

Hygrometer 820 measures ambient humidity, in well-known fashion, and transmits its measurements to processor 420.

Barometer 830 measures ambient air pressure, in well-known fashion, and transmits its measurements to processor 420.

Sound level meter 840 measures ambient sound intensity, in well-known fashion, and transmits its measurements to processor 420.

Photometer 850 measures ambient light intensity, in well-known fashion, and transmits its measurements to processor 420.

Figure 9:
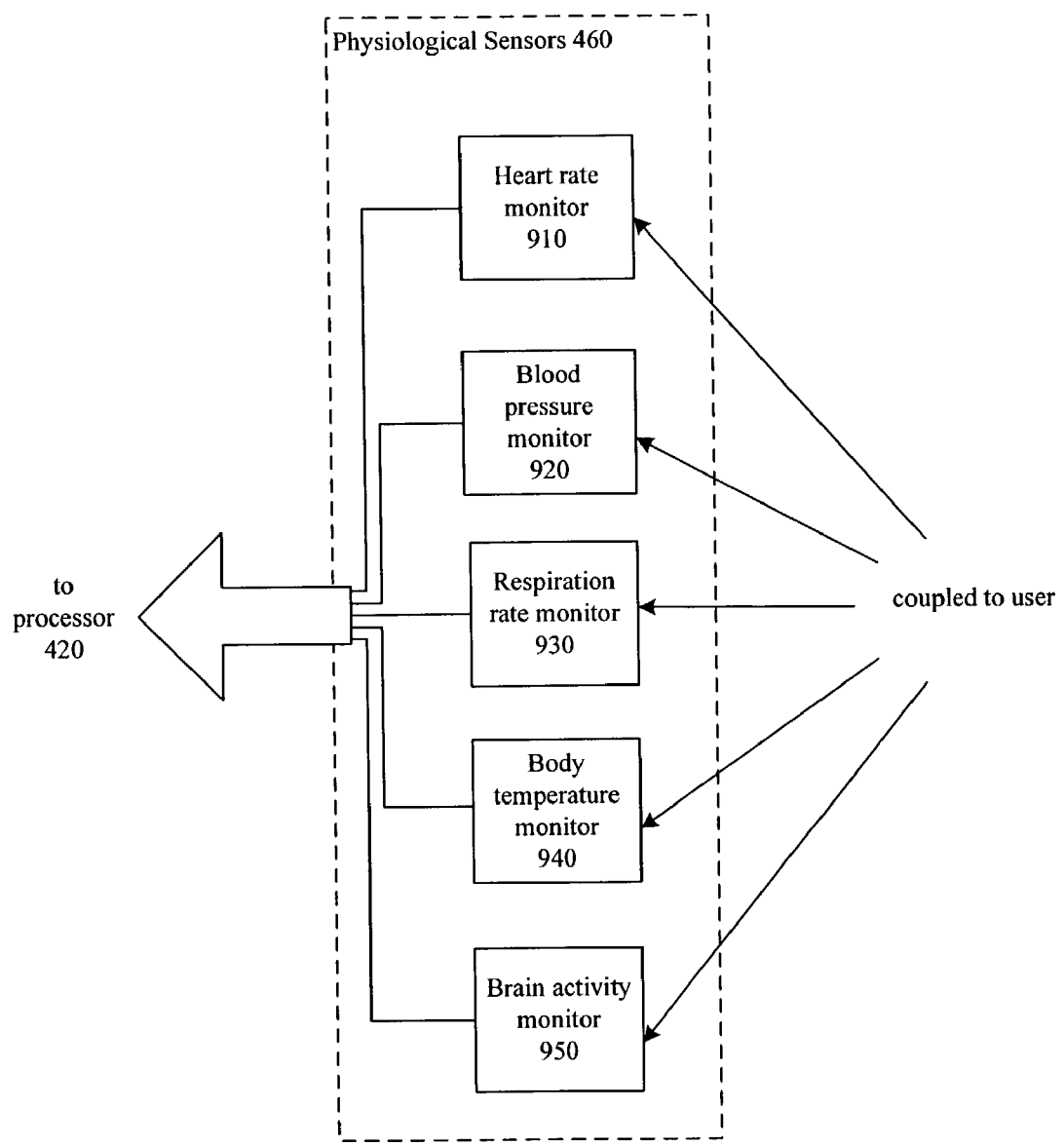
FIG. 9 depicts a block diagram of physiological sensors 460, as shown in FIGS. 4, 5, and 6, in accordance with the third illustrative embodiment of the present invention.

FIG. 9 depicts a block diagram of the salient components of physiological sensors 460, in accordance with the illustrative embodiment of the present invention. Physiological sensors 460 comprises: heart rate monitor 910, blood pressure monitor 920, respiration rate monitor 930, body temperature monitor 940, and brain activity monitor 950. In some embodiments, at least one of these monitors receives input from the user via at least one sensor coupled to a part of a user's body (e.g., finger, forehead, etc.), wherein the sensor transmits data to the terminal either by a wire, or wirelessly. In some other embodiments, at least one of these monitors receives input from the user via at least one sensor located within the terminal, wherein the sensor receives physiological signals from the user when the user is holding the terminal.

Heart rate monitor 910 measures the user's heart rate, in well-known fashion, and transmits its measurements to processor 420.

Blood pressure monitor 920 measures the user's blood pressure, in well-known fashion, and transmits its measurements to processor 420.

Respiration rate monitor 930 measures the user's respiration rate, in well-known fashion, and transmits its measurements to processor 420.

Body temperature monitor 940 measures the user's body temperature, in well-known fashion, and transmits its measurements to processor 420.

Brain activity monitor 950 measures the user's brain activity in well-known fashion (e.g., EKG, etc.), and transmits its measurements to processor 420.

Figure 10:
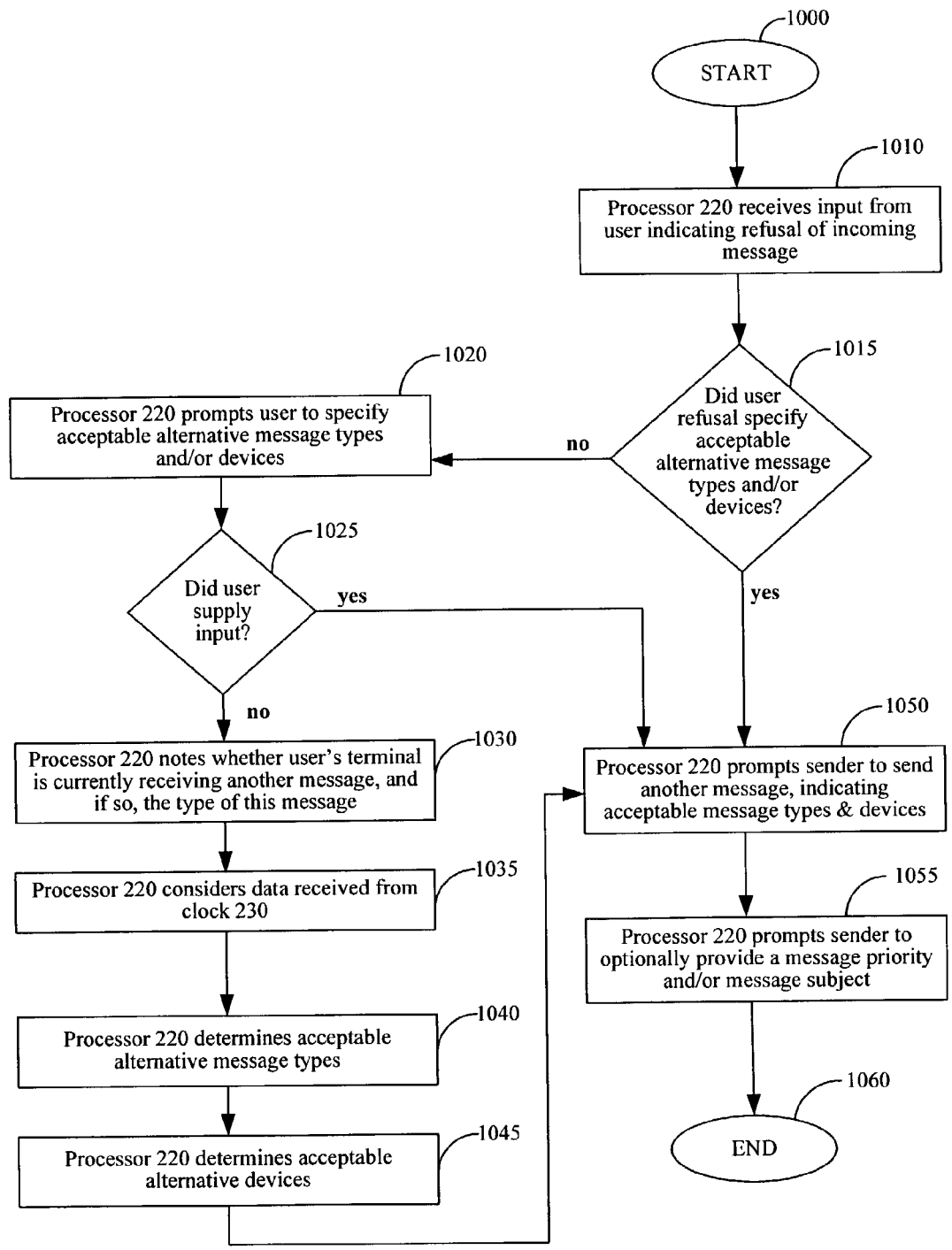
FIG. 10 depicts a flowchart for handling refusals for processor 220, as shown in FIG. 2, in accordance with the first illustrative embodiment of the present invention.

FIG. 10 depicts a flowchart of the operation of processor 220 when a user refuses an incoming message, according to the first illustrative embodiment of the present invention.

At task 1010, processor 220 receives user input indicating that the user has refused an incoming message.

At task 1015, processor 220 checks whether the user refusal included: one or more acceptable alternative message delivery mechanisms (hereafter referred to as message types), and/or one or more acceptable alternative devices to use in lieu of the initial message. In some embodiments, the telecommunications terminal might have a facility (e.g., keypad buttons, etc.) for proactively refusing the message and providing alternative delivery mechanisms and/or devices. If the user did include such information, processor 220 continues execution at task 1050, described below; otherwise, processor 220 continues execution at task 1020, described below.

At task 1020, processor 220 sends a prompting signal to the user via the appropriate transmitter 250; this signal asks the user to specify any acceptable alternative message types and/ or devices. The prompting signal could present the user with a menu in which the user can select the desired options (e.g., via keypad, voice input, etc.), as is well-understood in the art.

At task 1025, processor 220 checks whether the user responded to the prompt with any input. If so, processor 220 continues execution at task 1050, described below; otherwise, processor 220 continues execution at task 1030, described below.

At task 1030, processor 220 notes whether the user's terminal is currently receiving another message, and if so, the type of this message, for determining acceptable alternative message delivery options.

At task 1035, processor 220 considers data received from clock 230 for determining acceptable alternative message types and devices.

At task 1040, processor 220 determines any acceptable alternative message types based on the results of tasks 1030 and 1035.

At task 1045, processor 220 determines any acceptable alternative devices based on the results of tasks 1030 and 1035

At task 1050, processor 220 sends a signal to the sender via the appropriate transmitter; this signal prompts the sender to send another message if he/she wishes, indicating the acceptable alternative message types and devices.

At task 1055, processor 220 sends another signal prompting the sender to optionally provide a message priority and/or a message subject.

Figure 11:
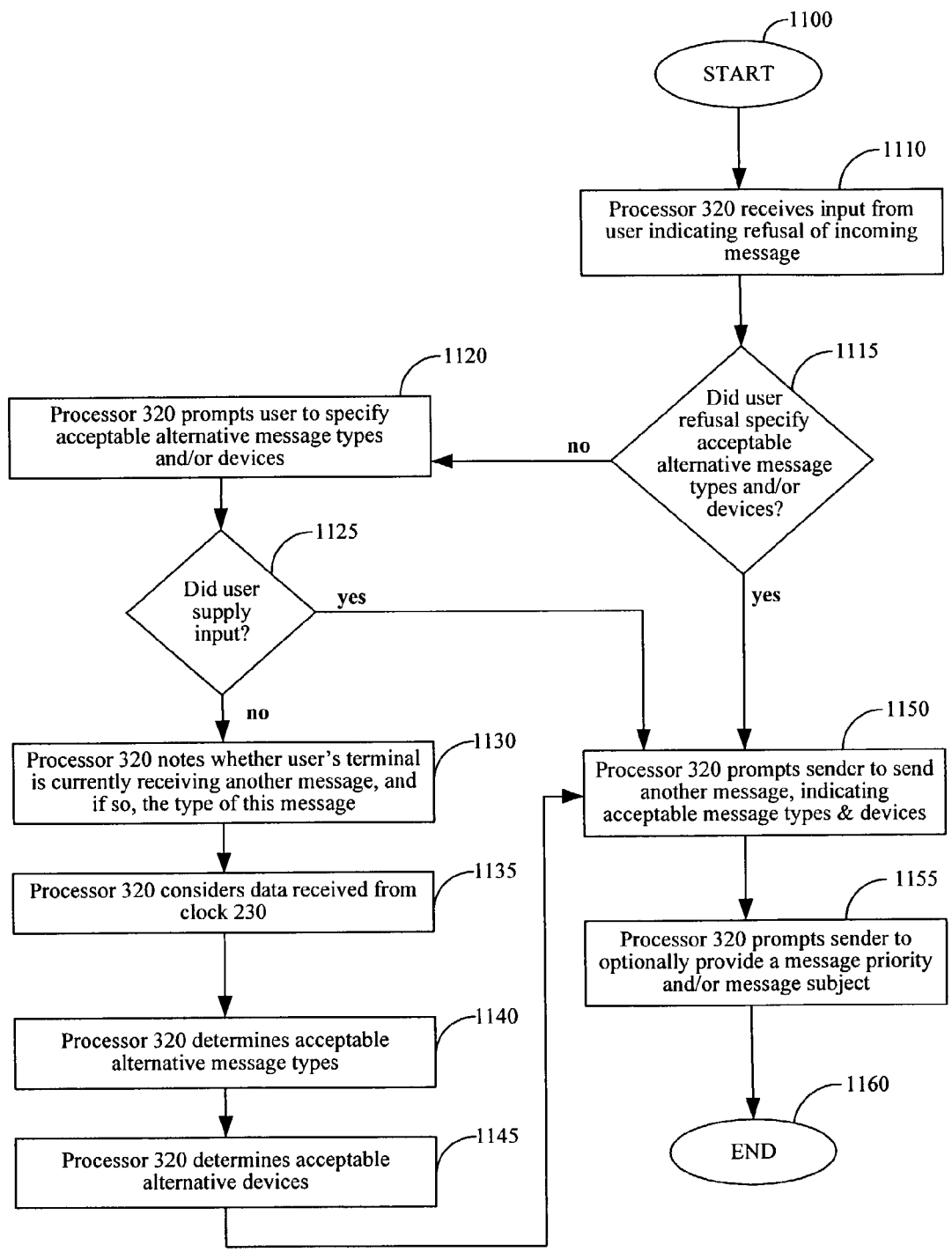
FIG. 11 depicts a flowchart for handling refusals for processor 320, as shown in FIG. 3, in accordance with the second illustrative embodiment of the present invention.

FIG. 11 depicts a flowchart of the operation of processor 320 when a user refuses an incoming message, according to the second illustrative embodiment of the present invention.

At task 1110, processor 320 receives user input indicating that the user has refused an incoming message.

At task 1115, processor 320 checks whether the user refusal included one or more acceptable alternative message types and/or devices. If the user did include such information, processor 320 continues execution at task 1150, described below; otherwise, processor 320 continues execution at task 1120, described below.

At task 1120, processor 320 sends a prompting signal to the user via the appropriate transmitter 350; this signal asks the user to specify any acceptable alternative message types and/or devices.

At task 1125, processor 320 checks whether the user responded to the prompt with any input. If so, processor 320 continues execution at task 1150, described below; otherwise, processor 320 continues execution at task 1130, described below.

At task 1130, processor 320 notes whether the user's terminal is currently receiving another message, and if so, the type of this message, for determining acceptable alternative message delivery options.

At task 1135, processor 320 considers data received from clock 230 for determining acceptable alternative message types and devices.

At task 1140, processor 320 determines any acceptable alternative message types based on the results of tasks 1130 and 1135.

At task 1145, processor 320 determines any acceptable alternative devices based on the results of tasks 1130 and 1135

At task 1150, processor 320 sends a signal to the sender via the appropriate transmitter 350; this signal prompts the sender to send another message if he/she wishes, indicating the acceptable alternative message types and devices.

At task 1155, processor 320 sends another signal prompting the sender to optionally provide a message priority and/or a message subject.

Figure 12:
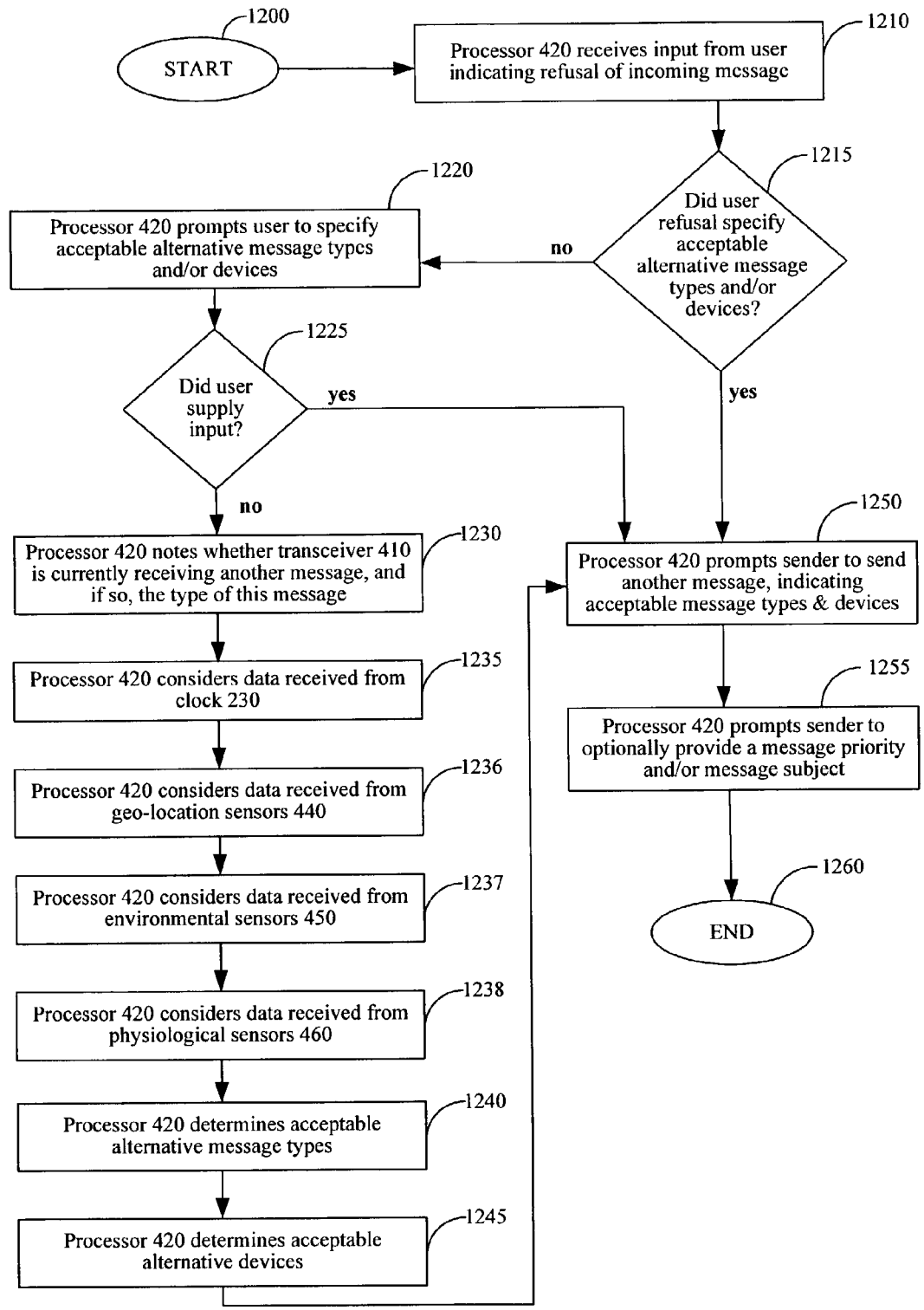
FIG. 12 depicts a flowchart for handling refusals for processor 420, as shown in FIGS. 4, 5, and 6, in accordance with the third illustrative embodiment of the present invention.

FIG. 12 depicts a flowchart of the operation of processor 420 when a user refuses an incoming message, according to the third illustrative embodiment of the present invention.

At task 1210, processor 420 receives user input indicating that the user has refused an incoming message.

At task 1215, processor 420 checks whether the user refusal included one or more acceptable alternative message types and/or devices. If the user did include such information, processor 420 continues execution at task 1250, described below; otherwise, processor 420 continues execution at task 1220, described below.

At task 1220, processor 420 sends a prompting signal to the user via transducer 425; this signal asks the user to specify any acceptable alternative message types and/or devices.

At task 1225, processor 420 checks whether the user responded to the prompt with any input. If so, processor 420 continues execution at task 1250, described below; otherwise, processor 420 continues execution at task 1230, described below.

At task 1230, processor 420 notes whether transceiver 410 is currently receiving another message, and if so, the type of this message, for determining acceptable alternative message types and devices.

At task 1235, processor 420 considers data received from clock 230 for determining acceptable alternative message types and devices.

At task 1236, processor 420 considers data received from geo-location sensors 440 for determining acceptable alternative message types and devices. For example, if the user is inside a church, a short message service (SMS) on the user's pager or a text chat on the user's PDA might be acceptable in lieu of an initial voice call attempt.

At task 1237, processor 420 considers data received from environmental sensors 450 for determining acceptable alternative message types and devices. For example, if the user is in a noisy environment, SMS, text chat, and/or email on any user device might be acceptable.

At task 1238, processor 420 considers data received from physiological sensors 460 for determining acceptable alternative message types and devices. For example, if the user is engaged in vigorous exercise, a voice call might be acceptable in lieu of an initial text chat attempt.

At task 1240, processor 420 determines any acceptable alternative message types based on the results of tasks 1230, 1235, 1236, 1237, and 1238.

At task 1245, processor 420 determines any acceptable alternative devices based on the results of tasks 1230, 1235, 1236, 1237, and 1238.

At task 1250, processor 420 sends a signal to the sender via transceiver 410; this signal prompts the sender to send another message if he/she wishes, indicating the acceptable alternative message types and devices.

At task 1255, processor 420 sends another signal to the sender prompting him/her to optionally specify a message priority and/or a message subject for the new message.

Figure 13:
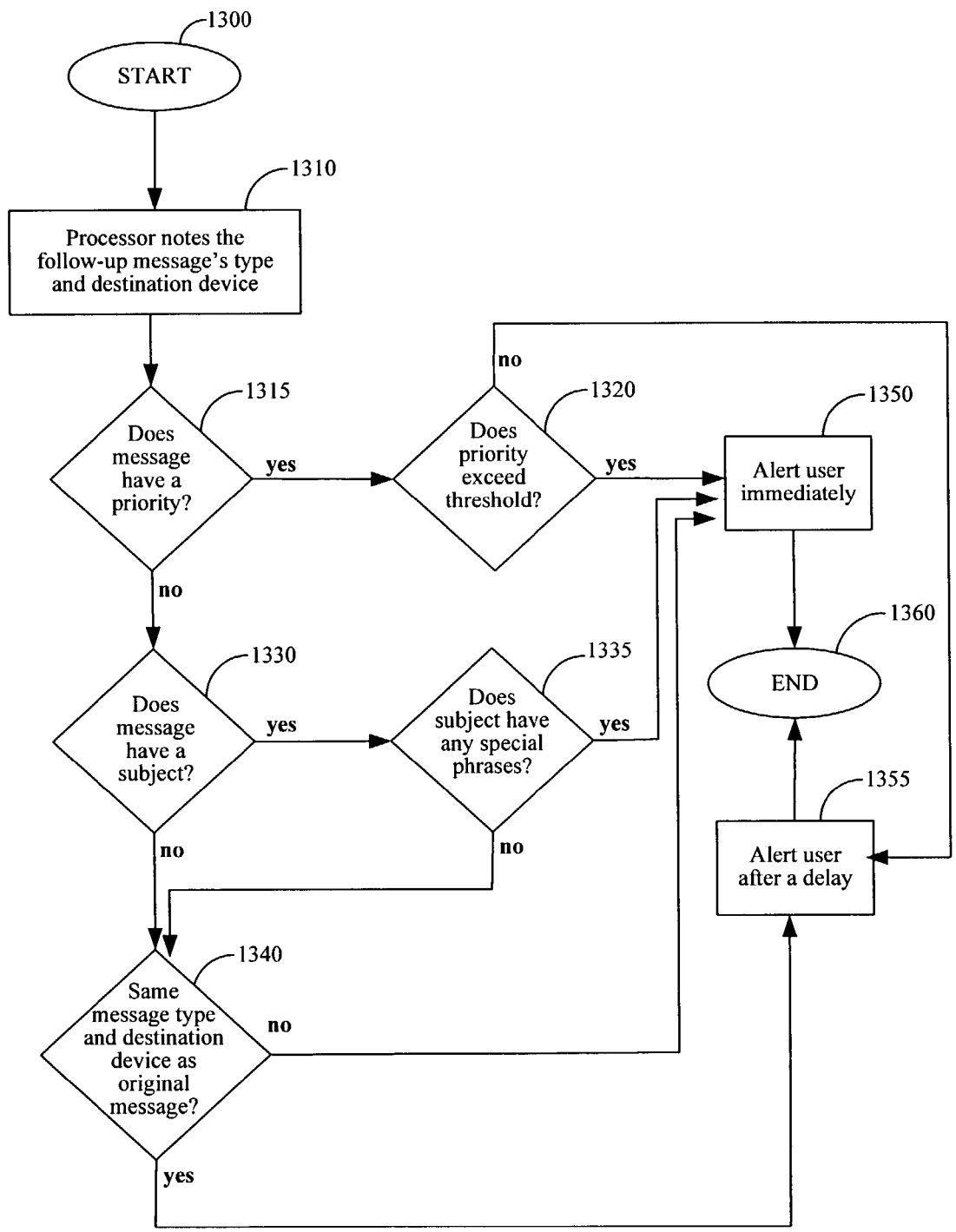
FIG. 13 depicts a flowchart for the execution of processors 220, 320, and 420 when a follow-up message is received at private branch exchange 120, central office 190, and a telecommunications terminal, respectively, in accordance with the first, second, and third illustrative embodiments of the present invention, respectively.

FIG. 13 depicts a flowchart of the execution of processors 220, 320, and 420 when a follow-up message is received at private branch exchange 120, central office 190, and a telecommunications terminal, respectively.

At task 1310, processor 220/320/420 notes the follow-up message's type and destination device.

At task 1315, processor 220/320/420 checks if the message has a priority; if it does, processor 220/320/420 continues execution at task 1320, described below; otherwise, processor 220/320/420 continues execution at task 1330, described below.

At task 1320, processor 220/320/420 compares the priority to a threshold; if the priority exceeds the threshold, processor 220/320/420 continues execution at task 1350, described below; otherwise, processor 220/320/420 continues execution at task 1355, described below.

At task 1330, processor 220/320/420 checks if the message has a subject; if it does, processor 220/320/420 continues execution at task 1335, described below; otherwise, processor 220/320/420 continues execution at task 1340, described below.

At task 1335, processor 220/320/420 checks whether the message subject contains any phrases in a list of pre-determined special phrases indicating urgency (e.g., "hospital," "earthquake," "medical emergency," etc.). It will be clear to those of ordinary skill in the art how to program processor 220/320/420 to perform such checking. If the message subject does have any special phrases, processor 220/320/420 continues execution at task 1350, described below; otherwise, processor 220/320/420 continues execution at task 1340, described below.

At task 1340, processor 220/320/420 checks whether the message type and destination are the same as for the original message; if so, processor 220/320/420 continues execution at task 1355, described below; otherwise, processor 220/320/420 continues execution at task 1350, described below.

At task 1350, processor 220/320/420 takes an appropriate action to alert the user to the follow-up message immediately. For processor 420, an exemplary action is to send an output signal to transducer 425; for processor 220, an exemplary action is to signal the appropriate transmitter to send the message from private branch exchange 120 to the destination device; for processor 320, an exemplary action is to signal the appropriate transmitter to send the message from central office 190 to the transmitter's corresponding private branch exchange or destination device. Persons skilled in the art will know how to program processors 220, 230, and 240 to perform such functions.

At task 1355, processor 220/320/420 takes an appropriate action to alert the user to the follow-up message after a time delay. From the description of the tasks above, it is apparent that task 1355 is executed either when
  the sender assigned a low priority to the follow-up message; or
  the sender did all of the following:
    (a) sent the follow-up message in the same exact manner as the original message (i.e., same message type and destination device);
    (b) did not assign the follow-up message a priority; and
    (c) either:
      (i) did not assign a message subject, or
      (ii) assigned a message subject that did not contain any special phrases.

The exemplary actions given in the previous paragraph apply to task 1355 as well.

It will be clear to those skilled in the art, after reading this specification, how to make and use; private branch exchanges in accordance with the first illustrative embodiment of the present invention; central offices in accordance with the second illustrative embodiment of the present invention; and telecommunications terminals in accordance with the third illustrative embodiment of the present invention.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
  a receiver for receiving a first signal associated with a first message sent via a first message type addressed to a telecommunications terminal; and
  a processor for prompting the sender of said first signal to send a second message via a second message type when said first signal is refused at said telecommunications terminal;
  wherein said processor automatically selects said second message type from a plurality of message types based on an ambient environmental property at said telecommunications terminal.

2. The apparatus of claim 1 wherein said apparatus is a private branch exchange.

3. The apparatus of claim 1 wherein said apparatus is a central office switch.

4. The apparatus of claim 1 wherein said telecommunications terminal comprises said apparatus.

5. The apparatus of claim 1 wherein the selection of said second message type is also based on a physiological property of the user of said telecommunications terminal.

6. An apparatus comprising:
  a receiver for receiving a first signal associated with a first message sent via a first message type addressed to a first telecommunications terminal; and
  a processor for prompting the sender of said first signal to send a second message to a second telecommunications terminal when said first signal is refused at said first telecommunications terminal;
  wherein said processor automatically selects said second telecommunications terminal from a plurality of telecommunications terminals based on an ambient environmental property at said first telecommunications terminal.

7. The apparatus of claim 6 wherein the selection of said second telecommunications terminal is also based on a physiological property of the user of said first telecommunications terminal.

8. The apparatus of claim 6 wherein said apparatus is a private branch exchange.

9. The apparatus of claim 6 wherein said apparatus is a central office switch.

10. The apparatus of claim 6 wherein said telecommunications terminal comprises said apparatus.

* * * * *